United States Patent [19]

Liautaud

[11] 4,319,097
[45] Mar. 9, 1982

[54] MOUNTING SYSTEM FOR A MOBILE MICROPHONE

[76] Inventor: James P. Liautaud, River and Bluff Rds., Cary, Ill. 60013

[21] Appl. No.: 146,758

[22] Filed: May 5, 1980

[51] Int. Cl.³ .......................... H04M 1/04; H04R 1/02
[52] U.S. Cl. ............................................... 179/146 R
[58] Field of Search ........................... 179/146 R, 179

[56] References Cited

U.S. PATENT DOCUMENTS 3,325,604 6/1967 Haus ................................ 179/146 R

FOREIGN PATENT DOCUMENTS 1168620 12/1958 France ............................ 179/146 R
674754 11/1964 Italy ................................. 179/146 R

*Primary Examiner*—George G. Stellar
*Attorney, Agent, or Firm*—Hill, Van Santen, Steadman, Chiara & Simpson

[57] ABSTRACT

A mobile microphone mounting system is disclosed for a mobile microphone having an encasement surrounding a microphone element. A rear wall of the encasement has a pocket with a thin wall at a base thereof. A ring-shaped magnet is positioned within the pocket with a flat major surface alongside the thin wall. A mounting member is mounted through a central aperture of the magnet to provide alternative mounting for the microphone. The magnet is positioned between a metal plate and the thin wall. A lip surrounding the pocket retains the plate and magnet therein. The microphone may be conveniently attached by magnetic attraction to any nearby surface or preferably to a cup-shaped metal mounting plate. A compatible clip assembly is also provided for alternative mounting.

16 Claims, 8 Drawing Figures

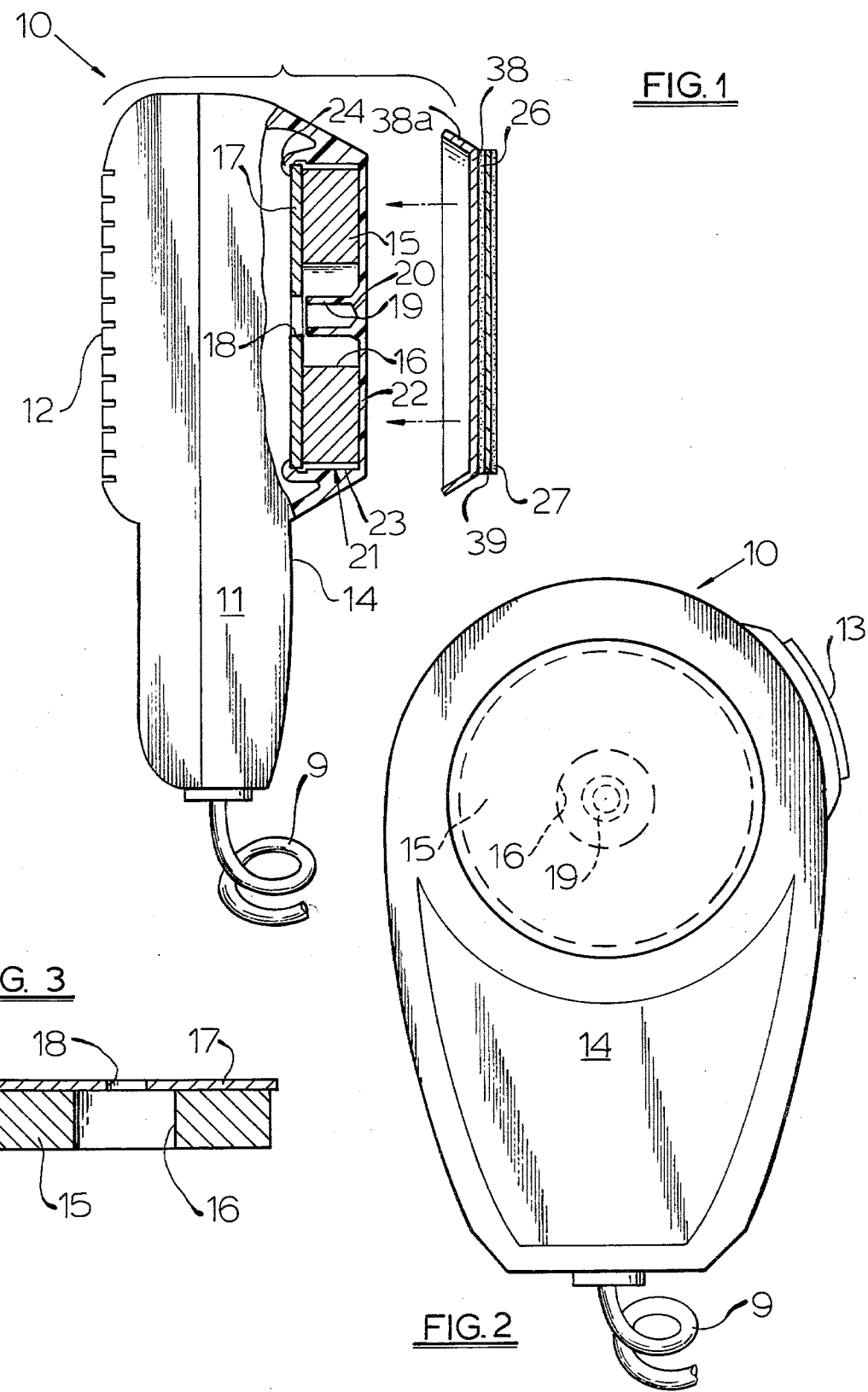

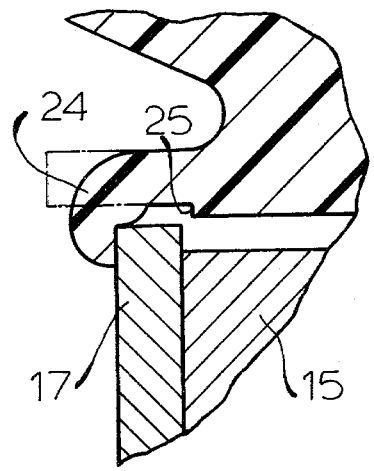
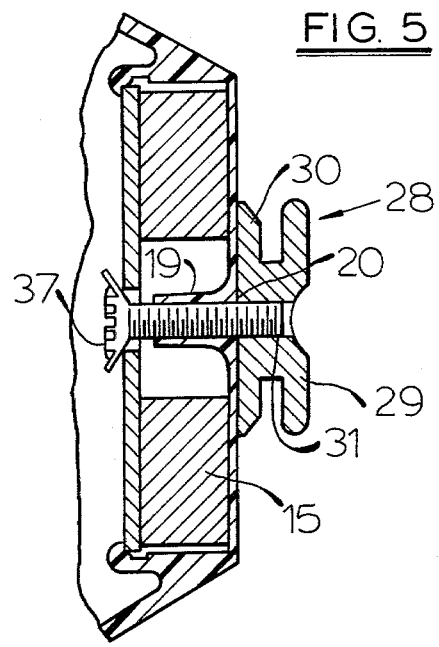
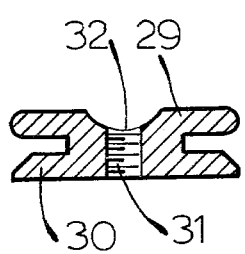
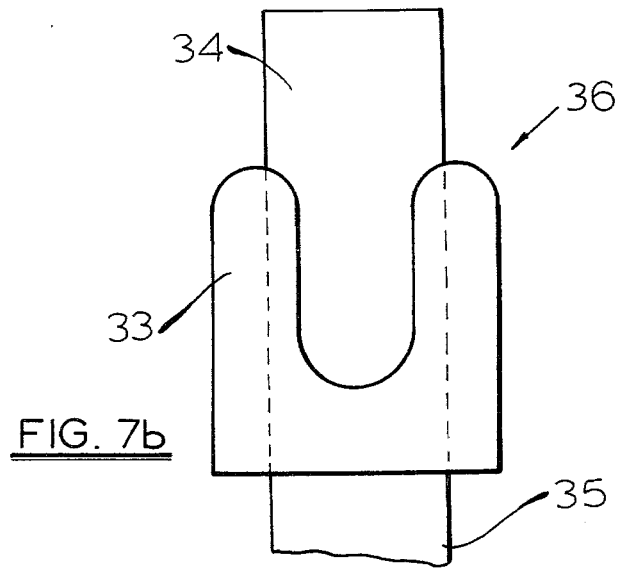
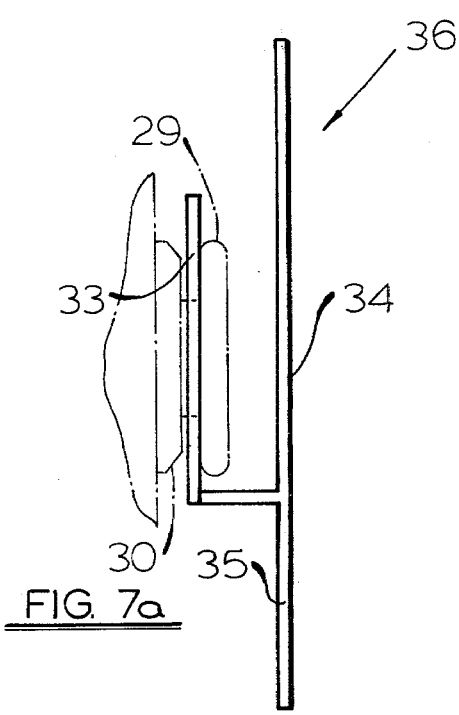

MOUNTING SYSTEM FOR A MOBILE MICROPHONE

BACKGROUND OF THE INVENTION

In the past, mobile microphones for vehicles were attached to the vehicle using a tongue and groove metal clip assembly well known in the art.

While driving the vehicle, it is often difficult to relocate the microphone in the exact position necessary for engagement of the tongue in the groove metal clip assembly such as for attachment either to the dash or to the radio.

Also, the existing mounting systems present a safety hazard since they require that the driver shift his vision momentarily from the direction of driving to the location of the clip, thus endangering navigation of the vehicle.

SUMMARY OF THE INVENTION

It is an object of the invention to provide a new and improved microphone mounting system for mobile applications such that the above described safety hazard is eliminated.

It is a further object of this invention to provide a simplified mobile microphone mounting system which does not require the operator of the vehicle to shift his vision to a particular mounting location for the microphone.

It is another object of this invention to provide a dual mounting system for the microphone which allows the user to either clip the microphone in place or to employ magnetic attachment.

It is another object of this invention to provide a mobile microphone which can be attached to nearby metal surfaces by magnetic attraction and wherein the magnet system provided may be inexpensively constructed in integral fashion with the microphone.

With the mobile microphone mounting system of the invention, a rear wall of the encasement surrounding a microphone element has a plastic pocket with a thin plastic wall at a base thereof. A magnet positioned within the pocket has a major surface positioned alongside the thin wall. Means are provided for retaining the magnet in this pocket.

Also, it is desirable to provide an additional clip which is compatible with the structure of the magnet so as to provide alternative mounting either by clipping or by magnetic mounting of the microphone.

With the microphone mounting system of the invention, the magnet allows the microphone to be instantly clamped to any portion of the metallic radio, other metal surface, or to a metal mounting cup of this invention and does not require the cumbersome tongue and groove clip assembly of the prior art.

BRIEF DESCRIPTION OF THE DRAWINGS

FIG. 1 is a side and partial cut-away view of the mobile microphone mounting system of the invention;

FIG. 2 is a rear view of the system of FIG. 1;

FIG. 3 is a cross-sectional view of a magnet and associated metal plate utilized in the mounting system of FIG. 1;

FIG. 4 is an enlarged detail cross-sectional view of the structure for retaining the magnet in a pocket of the microphone encasement;

FIG. 5 is a cross-sectional view illustrating the use of a compatible mounting clip for non-magnetic mounting;

FIG. 6 is a cross-sectional view of a post portion of the mounting clip; and

FIGS. 7a,b are a front view and side view of a socket for the mounting clip of FIG. 5.

DESCRIPTION OF THE PREFERRED EMBODIMENTS

The mobile microphone utilizing the inventive mounting system of the invention is generally illustrated at 10 in FIGS. 1 and 2. The microphone 10 has a plastic body or encasement 11 containing a carbon, crystal, dynamic, or other type of microphone element not specifically shown in the drawing. As is well known in the art, a grid or aperture pattern 12 is provided on a front face of the microphone through which the microphone user speaks. A push-to-talk button 13 is also provided typically on a side wall of the microphone.

The encasement 11 has a rear wall 14 with a molded plastic mounting pocket 21 positioned thereon with the pocket opening facing inwardly and a thin plastic wall 22 at the base of the pocket. Within the pocket 21 a ring-shaped magnet 15 is provided. The magnet must have sufficient attraction to allow mounting the microphone to typical metal surfaces and must take into account the thickness of the thin wall 22 at the base of the pocket. The magnet 15 could be of a solid cylindrical or other shape if an additional central mounting clip discussed below is not employed. Additionally, the magnet could be in a square loop or other loop-shape having a central aperture.

The ring-shaped magnet 15 more specifically shown in FIG. 3 has a central aperture 16 and a zinc backing plate or washer 17 attached by glue to one of its flat major surfaces. The other flat major surface of the magnet 15 abuts against the thin wall 22. The magnet is preferably a ceramic ring magnet of barium ferrite. The plate 17 serves to concentrate the magnetic field toward the exterior by effecting flux lines in the interior of the microphone.

Within the central aperture 16 of the magnet 15 a hollow plastic boss 19 is provided forming a screw receiving pocket. A centrally positioned aperture 18 is also provided in alignment with the boss 19 in the plate 17. The boss 19 has a closed portion 20 at the bottom thereof. As will be explained later relative to FIG. 5, this closed portion 20 is removed when a screw is threaded through the boss to mount a clip assembly.

The mounting pocket 21 is preferably molded with the rear wall 14 and is formed by the above described thin base wall 22 and has side walls 23. On a periphery at one end of the side wall 23 an extension is provided forming a lip 24 defined by a step 25 as shown in FIG. 4. This lip 24 may be heated and staked over into contact with the metal plate 17 so as to retain the metal plate and magnet within the pocket.

As shown in FIG. 1, the entire pocket 21 is substantially offset outwardly from a plane of the rear wall 14 so as not to interfere with the internal microphone element.

The thin wall 22 is preferably smooth and must not be distorted when the magnet is stacked in the pocket. Also, the magnet should be clean of foreign matter prior to insertion.

The magnetization pattern of the magnet is preferably 6-pole and the backplate 17 is preferably cold rolled steel.

Referring to FIG. 1, a cup-shaped washer 38 of steel is provided having dimensions which correlate with the shape of the microphone rear surface at the magnet. This cup-shaped washer 38 therefore has angled side walls 38a which prevent dislodging of the microphone when it is magnetically attracted to the base of the cup-shaped washer 38. The steel washer 38 is attached by a sticky adhesive layer 26 to a thin aluminum flexible washer 39. Finally, a second sticky adhesive layer 27 is applied on the opposite side of the thin aluminum washer or plate 39 to permit adhesion to the dashboard of the vehicle, for instance. Since the thin aluminum plate is flexible, it can conform to the shape of the mounting surface such as a curved dashboard.

Referring now to FIG. 5, the alternative use of a clip assembly for mounting the microphone instead of magnetic mounting is illustrated. The clip assembly is fully compatible with the provision of magnetic mounting. A mounting screw 37 is threaded through the boss 19 and breaks through the closed portion 20 towards the exterior of the microphone. A mounting post 28 is then threaded onto the screw 37 by use of an aperture 31 more clearly shown in FIG. 6. The post 28 includes a base portion 30 and a disc-shaped portion 29 which is receivable in the post receiving clip 36 shown in FIG. 7a and FIG. 7b. The clip has a U or fork-shaped front portion 33 and a back portion 34 joined together at a lower mounting portion 35. The post portion 29 slips between the back portion 34 and forked portion 33.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A mobile microphone mounting system, comprising: a mobile microphone having an encasement surrounding a microphone element; a rear wall of the encasement having a pocket with a thin wall at a base thereof; a magnet positioned within the pocket with a major surface thereof positioned alongside said thin wall; a thickness of the thin wall being sufficiently small to permit significant magnetic attraction therethrough; and means for retaining the magnet in the pocket.

2. The system of claim 1 wherein the magnet has a ring-shape with a cylindrical side wall and flat end-surfaces, one of which is positioned parallel and adjacent to said thin wall.

3. The system of claim 2 wherein a mounting element is secured by a fastening member passing through the ring-shaped magnet.

4. The system of claim 3 wherein the mounting element comprises a mounting post.

5. The system of claim 1 wherein the thin wall is thinner than adjacent portions of the encasement rear wall.

6. The system of claim 1 wherein the pocket extends substantially outwardly of a plane defined by surrounding portions of the rear wall.

7. The system of claim 1 wherein a metal plate is positioned adjacent a surface of the magnet opposite said major surface and the magnet is secured within the pocket by securing means in contact with the metal plate, said metal plate increasing magnetic attraction external to the microphone encasement.

8. The system of claim 7 wherein the metal plate comprises zinc.

9. The system of claim 7 wherein a mounting member is attached to the metal plate by a screw passing through an aperture in the magnet.

10. The system of claim 1 wherein said means for retaining comprises a portion of the encasement forming a lip surrounding the pocket and the magnet and staked inwardly to retain the magnet within the pocket.

11. The system of claim 1 wherein a boss having a cup-shaped interior depends from said thin wall into an aperture of the magnet.

12. The system of claim 10 wherein a step portion defines the lip.

13. The system of claim 1 wherein a cup-shaped steel plate adapted to fit over a portion of the encasement retaining the magnet is provided to which the microphone may be magnetically attached.

14. The system of claim 1 wherein a metal mounting plate is fastened to a flexible aluminum plate, the aluminum plate being mounted to a surface in the vehicle and the microphone being magnetically attached to the metal mounting plate.

15. A mobile microphone mounting system, comprising: a microphone having an encasement surrounding a microphone element; a rear wall of the encasement having a plastic pocket with a thin plastic wall defining a portion of said rear wall; a magnet means within the encasement and within the pocket for mounting the microphone by magnetic attraction through said thin wall to nearby metal surfaces.

16. A mobile microphone mounting system, comprising: a mobile microphone having an encasement surrounding a microphone element; a rear wall of the encasement having a pocket with a base wall thinner than adjacent rear wall portions and sufficiently thin to permit mounting of the microphone to metal surfaces by magnetic attraction by a magnet positioned in the pocket; said magnet positioned within the pocket having a closed-loop shape with flat side walls perpendicular to the base wall and a central aperture; said magnet having flat parallel opposite faces lying between and in respective contact with the base wall and a metal plate; a mounting lip acting against said metal plate to retain said magnet in the pocket; and means for securing a mechanical mounting member to the metal plate through the magnet central aperture.

* * * * *